United States Patent
von Schleinitz

(10) Patent No.: US 10,590,991 B2
(45) Date of Patent: Mar. 17, 2020

(54) ROLLING-ELEMENT BEARING

(71) Applicant: Aktiebolaget SKF, Gothenburg (SE)

(72) Inventor: Thilo von Schleinitz, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 16/217,151

(22) Filed: Dec. 12, 2018

(65) Prior Publication Data

US 2019/0186544 A1 Jun. 20, 2019

(30) Foreign Application Priority Data

Dec. 15, 2017 (DE) .................. 10 2017 222 919

(51) Int. Cl.
| | |
|---|---|
| *F16C 33/62* | (2006.01) |
| *F16C 19/26* | (2006.01) |
| *F16C 33/30* | (2006.01) |
| *F16C 19/06* | (2006.01) |

(52) U.S. Cl.
CPC .............. *F16C 33/62* (2013.01); *F16C 19/06* (2013.01); *F16C 19/26* (2013.01); *F16C 33/30* (2013.01); *F16C 2206/02* (2013.01); *F16C 2223/30* (2013.01)

(58) Field of Classification Search
CPC .......... F16C 33/32; F16C 19/06; F16C 19/26; F16C 33/30; F16C 2206/02; F16C 2223/30; F16C 33/62
See application file for complete search history.

(56) References Cited

U.S. PATENT DOCUMENTS

| | | | | |
|---|---|---|---|---|
| 3,737,204 A | * | 6/1973 | Burkhardt | F16C 33/64 384/569 |
| 6,886,986 B1 | * | 5/2005 | Julien | B21K 1/02 29/898 |
| 8,801,292 B2 | * | 8/2014 | Kobayashi | F16C 19/26 384/463 |
| 9,011,014 B2 | * | 4/2015 | Suzuki | F16C 19/08 384/477 |
| 9,011,019 B2 | * | 4/2015 | Kobayashi | F16C 19/26 384/569 |
| 9,322,074 B2 | * | 4/2016 | Gegner | F16C 33/58 |
| 2014/0356639 A1 | * | 12/2014 | Gegner | B05D 1/18 428/469 |
| 2018/0128317 A1 | * | 5/2018 | Horchheimer | F16C 33/62 |
| 2018/0313337 A1 | * | 11/2018 | McGrath | F03D 80/70 |

\* cited by examiner

*Primary Examiner* — Thomas R Hannon
(74) *Attorney, Agent, or Firm* — J-TEK Law PLLC; Scott T. Wakeman; Mark A. Ussai

(57) ABSTRACT

A rolling element bearing includes inner and outer rings having raceways and rolling elements between the raceways. The raceways of the inner and outer rings are coated with a first coating, such as a phosphate coating, and the rolling elements are coated with a second, different, coating such as a black oxide coating.

10 Claims, 1 Drawing Sheet

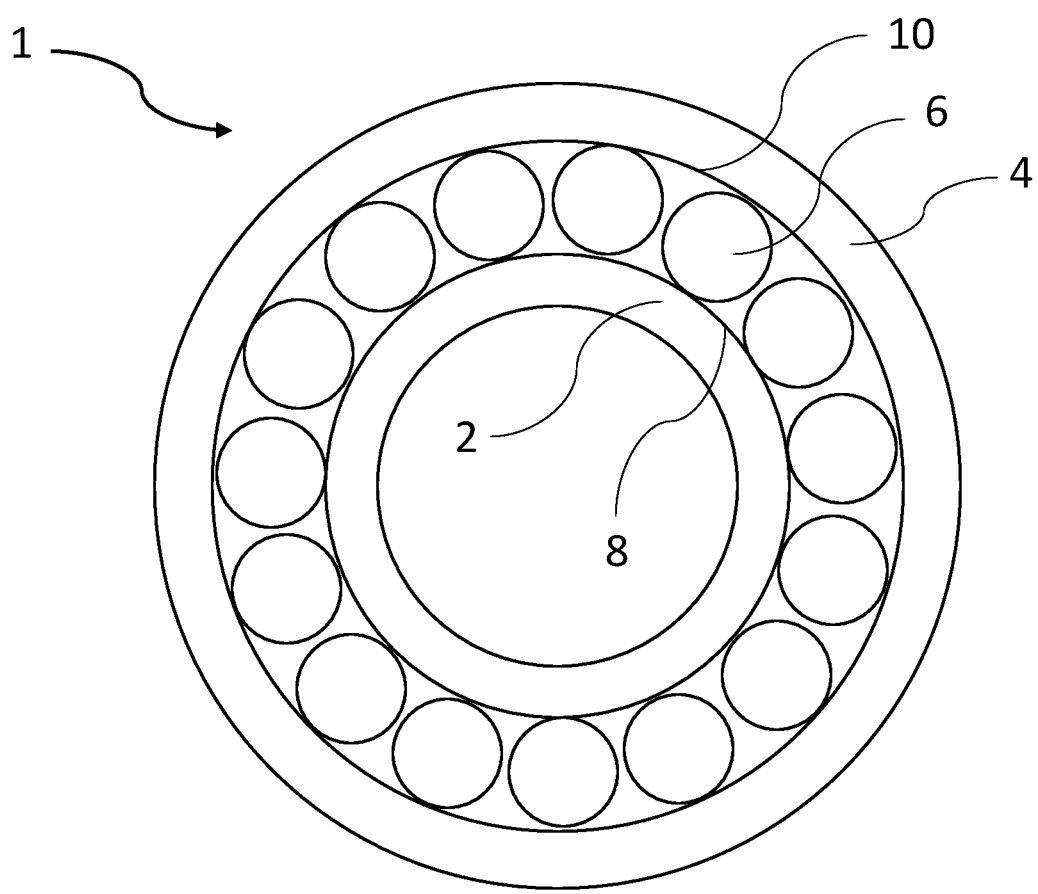

ROLLING-ELEMENT BEARING

CROSS-REFERENCE

This application claims priority to German patent application no. 10 2017 222 919.5 filed on Dec. 15, 2017, the contents of which are fully incorporated herein by reference.

TECHNOLOGICAL FIELD

The present disclosure relates to a rolling-element bearing having an inner ring and an outer ring and rolling elements therebetween where the rings and/or the rolling elements include protective coatings.

BACKGROUND

In rolling-element bearings the surfaces of the rings (or of the raceways) as well as of the rolling elements are often coated in order to achieve a protection of the surfaces or an improved function of the rolling-element bearing.

For example, the surfaces, in particular of the rolling elements, can be subjected to a black oxide process such as a bluing in order to produce a multifunctional layer that protects the rolling elements. This frequently occurs in connection with fully blued bearings. Bluing offers a reduction of damage mechanisms, for example, a corrosion protection of the surfaces. In addition, bluing improves the run-in properties of the surfaces.

Furthermore, there is the possibility of providing the rolling elements as well as the bearing rings with a phosphate coating. A sliding or separating layer is generated by such a phosphate coating between the mutually rubbing surfaces of the rolling-element bearing, i.e., between the rolling elements and the raceways.

Both with a bluing and with a phosphate coating the raceways of the bearing rings and the counter-races of the rolling elements are each coated with the same system, provided all surfaces are coated. Here the bluing is generated in an alkaline manner and is thus soluble in acid, whereas a phosphate coating is generated acidically and is thus alkali-soluble. A bearing including blued or phosphated surfaces is therefore either only alkaline or acid-resistant. If the rolling-element bearing is exposed to a corresponding acidic or alkaline environment, the coatings of the surfaces are therefore impaired or eliminated, and the surfaces of the bearing rings and of the rolling elements can therefore no longer be held separate from each other depending on the chemical action, i.e., they rub directly against each other or have metallic contact. The service life of the bearing or of the individual components can thus be reduced.

SUMMARY

It is therefore an aspect of the present disclosure to provide a rolling-element bearing, wherein under the most different conditions of use a protective layer remains between the surfaces of the rolling-element bearing that are moving against each other.

The disclosed rolling-element bearing includes an inner ring and an outer ring between which rolling elements are rotatably disposed. The rolling-element bearing can be a tapered roller bearing, a spherical roller bearing, a toroidal roller bearing (CARB), a ball bearing, or a cylindrical roller bearing.

In order to ensure under the most diverse conditions of use that a separating surface is present between the surfaces of the rolling elements and the raceways, according to the disclosed rolling-element bearing it is provided that a raceway of the inner ring and/or a raceway of the outer ring is coated with a first coating, and that the rolling elements are at least partially coated with a second coating, wherein the first coating and the second coating are different from each other.

Due to the use of two different coatings it can be ensured that under all conditions of use of the rolling-element bearing (e.g., alkaline or acidic environment) one of the two coatings is less worn out than the other. For example, the first coating can be configured resistant to alkali, and the second coating resistant to acid. A protective layer thus always remains between the surfaces of the bearing rings or of the rolling elements, which surfaces move against each other.

Furthermore, coatings can be combined that offer different advantages, whereby protection mechanisms of both coatings can be used for the rolling-element bearing.

According to one embodiment the first or the second coating is a phosphate coating. The phosphate coating can be, for example, a manganese phosphate coating, a zinc phosphate coating, a zinc calcium phosphate coating, or a tricationic phosphate coating.

The phosphate coating can be applied onto the raceways of the bearing rings or the surfaces of the rolling elements by a rapid and hot process. By the process parameters being adapted accordingly with applying of this coating, a pitting, which can lead to microcrack formation, can be reduced.

According to a further embodiment the first coating is a phosphate coating, wherein the second coating has a higher hardness than the first coating.

This has the advantage that the (somewhat thicker) phosphate coating is applied onto the bearing rings, whereas the second coating, which can be configured thinner, is applied onto the rolling elements. If this were to be applied onto the rolling elements instead of onto the ring raceways, with a reduction of the thickness of the phosphate coating the rolling elements would have too much clearance; the bearing clearance would thus increase. This would very rapidly be the case since the thickness of the softer phosphate coating would be reduced more quickly in comparison to the thickness of the harder second coating.

The second coating can be, for example, a black oxide coating such as a bluing. The bluing can have a lesser thickness in the range of approximately 1 μm and is of a more stable and thus more incompressible structure. In addition, it is a pure oxidation of the substrate and not an overlying layer. On the other hand, the phosphate coating has a higher thickness of usually a plurality of micrometers and is comprised of overlying crystal layers including cavities and imperfections, whereby it is compressible under pressure and partially displaceable as well as less smear resistant. From this it arises that the bluing is harder in comparison to the phosphate coating. Therefore in the following a greater hardness of the bluing is always spoken of.

The phosphate coating forms a porous layer that holds lubricant ready like a sponge. The phosphate coating can also serve as a sliding layer, since it forms a soft layer that is comprised of a plurality of (at least two) crystal layers, which is displaceable into itself at high load under wear and thus slippery. In addition to the sliding layer the phosphate coating also serves as a separating layer against metallic contact. In comparison to a bluing the phosphate coating offers a significantly higher rust protection. Furthermore, the phosphate coating improves the running-in behavior of the raceways by filling in unevennesses of the roughness structure of the surfaces.

Furthermore, it can be achieved by the different coatings that one of the coatings serves as a sliding and separating layer. At the same time the rolling elements are coated with a thin different type coating that has a different hardness. Here the coating of the rolling elements should not wear or at least in the event of wear does not generate a significant dimensional change. In this way it can be ensured that the bearing clearance does not significantly increase even with wear of the coatings.

According to one embodiment the first coating has a thickness of 1 to 6 μm, in particular 2 to 4 μm. This coating thickness is sufficient to ensure a protection of the surfaces, but is simultaneously thin enough to keep the bearing clearance increase to an acceptable amount even with wear or reduction of the phosphate coating.

According to one embodiment the second coating is a carbon layer. The carbon layer can be, for example, a DLC layer (diamond-like carbon), such as, for example, a graphite layer, a diamond layer, or an amorphous carbon layer. A WC/C layer (tungsten carbide carbon) can also be provided, wherein it is a combination of a metal layer and a diamond-like carbon. Due to this coating the rolling elements are protected against damage mechanisms and have, for example, wear protection, dirt tolerance, and favorable friction characteristics.

According to a preferred embodiment the second coating of the rolling elements can be a bluing. With bluing the rolling elements are immersed into an alkaline solution, by which a conversion layer is formed. A conversion layer is a very thin layer on a metal surface that is generated by the chemical reaction of an aqueous treatment solution (in this case an alkaline solution) with the metallic base, i.e., the surface of the rolling elements. Due to this coating the rolling elements are also protected against damage mechanisms.

A bluing offers a very thin coating that is not dimension or tolerance altering. Unlike with a phosphate coating the thickness of the coating is not substantially reduced in operation. The bluing is therefore preferably used for the rolling elements since the thickness of the coating and thus the dimension of the rolling elements does not substantially change in operation and the bearing clearance therefore does not increase.

Furthermore, an improved oil adhesion by adhesion on the surface is provided by a bluing. The bluing further ensures a light rust protection of the coated surfaces, a reduced friction, and an improved run-in behavior due to smoothing of the roughness structure of the surfaces. In addition, a cold welding between the steel surfaces of the rolling elements and raceways of the rings is prevented and damage mechanisms with a tearing-off lubricating film are prevented. Furthermore, the bluing reduces micropitting, smearing, spalling, friction corrosion, crack formation, and adhesion wear. The bluing also serves as a hydrogen barrier and prevents an attack by EP additives (extreme pressure additives).

According to a further embodiment the rolling elements are preferably completely coated with the second coating. In this way the rolling elements in their entirety can be protected against damage mechanisms. Furthermore, the manufacturing of completely coated rolling elements is simpler. Since the bluing and/or carbon layer can be configured very thin, the dimensions of the rolling elements can be substantially maintained even when the coating is reduced by wear.

According to a further embodiment the raceway of the inner ring and/or the raceway of the outer ring is completely coated with the first coating. Due to a complete coating of the raceway or of the raceways a particularly good sliding and separating layer can be provided between the surfaces of the bearing rings and of the rolling elements, which surfaces move against each other, by the phosphate coating.

The inner ring and/or the outer ring are preferably completely coated with the first coating. A better protection of the rings against damage mechanisms, for example, against rust, and thus of the entire rolling-element bearing can be provided by a complete coating of the rings. Furthermore, bearing rings having a complete coating are more easily and more cost-effectively manufacturable.

Due to water in a lubricating oil used for the rolling-element bearing, surface fatigue, roller flange fretting, and smearing can occur. This results from the fact that water does not form a separating lubricating film, and the lack of a lubricating film or the reduced lubricating film thickness promotes such wear phenomena. Due to the combination of raceways including a first coating, namely a phosphate coating, and rolling elements including a second coating, namely a black oxide coating or bluing that has a higher hardness than the first coating, the negative effect of the water in the lubricating oil can be minimized. For example, the pH value of the lubricating oil can change due to the water. Since the rolling-element bearing includes coatings that withstand different (acidic or alkaline) conditions, only one of the coatings is attacked by the changed pH value. At least one protective layer thus remains between the surfaces of the bearing rings and of the rolling elements, which surfaces are moving against each other.

Furthermore, a good sliding and separating layer is provided by the phosphate coating, while simultaneously smearing can be avoided due to the coated rolling elements. The service life of the bearing can thus be increased.

Precisely by the combination of two different coatings, in particular of a phosphate coating and of a bluing, the following advantages can be achieved. The combination of the coatings offers a significantly lower friction than a phosphated surface against a further phosphated surface. Furthermore, in operation a clearance increase of the bearing is far less than with the use of two phosphate coatings, since the rolling-element set can still add an unfavorable four-fold layer thickness to the clearance.

The outer-lying rings can obtain a higher rust protection due to the phosphate coating; the inner-lying rolling elements can obtain a somewhat lower rust protection due to the bluing. Since the two coatings have two different mechanisms for holding a lubricant, the lubricant can be kept in the contact zones in an improved manner. The separation of the surfaces is also effected by two different principles.

The different coatings also lead to an improvement in the intake and an improvement of the emergency running properties due to two different effects. Furthermore, a protection of the surfaces is effected once by a passive layer (bluing) and once by an overlying protective layer (phosphate coating).

Due to the combination of both coating systems the protective systems of both coating types are combined. In this way an improvement of the bearing service life can result in particular under extreme conditions of use.

Further advantages and advantageous embodiments are specified in the description, the drawing, and the claims. Here in particular the combinations of features specified in the description and in the drawing are purely exemplary, so that the features can also be present individually or combined in other ways.

In the following the invention shall be described in more detail using exemplary embodiments depicted in the drawing. Here the exemplary embodiments and the combinations shown in the exemplary embodiments are purely exemplary and are not intended to define the scope of the invention. This scope is defined solely by the pending claims.

BRIEF DESCRIPTION OF THE DRAWING

FIG. 1 is a sectional view of a rolling-element bearing including an inner ring and an outer ring according to the present disclosure.

DETAILED DESCRIPTION

In the following, identical or functionally equivalent elements are designated by the same reference numbers.

In FIG. 1 a rolling-element bearing 1 is depicted in a greatly simplified outline. The rolling-element bearing 1 includes an inner ring 2 and an outer ring 4. Rolling elements 6 are rotatably disposed between the two rings 2, 4. Here the rolling elements 6 run against an outer surface 8 of the inner ring 2 as well as an inner surface 10 of the outer ring 4. In order to protect the raceways 8, 10 as well as the rolling elements 6 against wear, these are each provided with a coating. Here the coating of the rolling elements 6 can have a greater hardness than a coating of the raceways 8, 10. The coating of the rolling elements 6 can be, for example, a bluing.

The ring raceways 8, 10, and preferably the entire rings 2, 4 are provided with a phosphate coating in order to provide a sliding layer for the rolling elements 6. In particular, a smearing of the rolling elements 6 can be prevented by the coating of the rolling elements 6.

Here both the phosphate coating and the coating of the rolling elements 6 can be configured so thin that even with wear of the coatings the bearing clearance in the rolling-element bearing is increased only in an acceptable range. Since the coating of the rolling elements 6 is harder than the phosphate coating, the coating of the rolling elements 6 is preferably not worn and thus remains even with a reduced thickness of the phosphate coating as a separating layer between the rolling elements 6 and the raceways 8, 10.

Furthermore, a bluing is preferably provided for the rolling elements 6, since this can be applied very thinly. In comparison thereto the phosphate coating is thicker. If the phosphate coating were to be applied onto the rolling elements 6, with a reduction of the thickness of the phosphate coating (which occurs very quickly due to the softness of the phosphate coating in operation) the layer thickness of the rolling elements 6 would be reduced and a clearance would be present between the rolling elements 6. In order to prevent the phosphate coating from rapidly losing layer thickness in operation, which would unacceptably increase the bearing clearance, the phosphate coating may not be applied to all components. Phosphate on rings and rollers would generate too large a clearance change. The phosphate coating is therefore preferably applied onto the rings since the essential effects of phosphate, inter alia corrosion protection and prevention of fretting corrosion, are predominantly required on the rings. The rollers are therefore provided with a thin and dimensionally stable layer, preferably a bluing. In this way the coatings of the rollers do not additionally contribute to the phosphate-typical clearance enlargement.

With the disclosed rolling-element bearing it is possible to provide a rolling-element bearing that can reduce wear of the rolling-element bearing under the most diverse conditions of use, for example, even in an acidic or alkaline environment, since at least one of the layers used remains and thus a protective layer remains between the surfaces of the bearing rings and of the rolling elements, which surfaces move against one another. Furthermore, due to the two different coatings the running properties of the rolling-element bearing can be improved since the advantages of both coatings can be utilized.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved rolling-element bearings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Rolling-element bearing
2 Inner ring
4 Outer ring
6 Rolling element
8 Raceway
10 Raceway

The invention claimed is:
1. A rolling element bearing comprising:
an inner ring having a raceway,
an outer ring having a raceway, and
a plurality of rolling elements rotatably disposed between the inner ring and the outer ring,
wherein the raceway of the inner ring and/or the raceway of the outer ring is coated with a first coating,
wherein the rolling elements are at least partially coated with a second coating,
wherein the first coating is a phosphate coating selected from the group consisting of a manganese phosphate coating, a zinc phosphate coating, a zinc calcium phosphate coating, and a tricationic phosphate coating, and wherein the second coating is a black oxide coating.

2. The rolling-element bearing according to claim 1, wherein the first coating has a thickness of 2 to 4 µm.

3. The rolling-element bearing according to claim 1, wherein the rolling elements are completely coated with the second coating.

4. The rolling-element bearing according to claim 1, wherein the raceway of the inner ring and/or the raceway of the outer ring are completely coated with the first coating.

5. The rolling-element bearing according to claim 1, wherein the inner ring and/or the outer ring are completely coated with the first coating.

6. A rolling element bearing comprising:

an inner ring having a raceway, an outer ring having a raceway, and a plurality of rolling elements rotatably disposed between the inner ring and the outer ring, wherein the raceway of the inner ring and/or the raceway of the outer ring is coated with a first coating, wherein the rolling elements are at least partially coated with a second coating, wherein the first coating is a phosphate coating selected from the group consisting of a manganese phosphate coating, a zinc phosphate coating, a zinc calcium phosphate coating, and a tricationic phosphate coating, and wherein the second coating is a bluing.

7. The rolling-element bearing according to claim 6, wherein the first coating has a thickness of 2 to 4 µm.

8. The rolling-element bearing according to claim 6, wherein the rolling elements are completely coated with the second coating.

9. The rolling-element bearing according to claim 6, wherein the raceway of the inner ring and/or the raceway of the outer ring are completely coated with the first coating.

10. The rolling-element bearing according to claim 6, wherein the inner ring and/or the outer ring are completely coated with the first coating.

* * * * *